June 29, 1926.

C. A. REBHUN 1,590,316

DISPLAY RACK

Filed Oct. 16, 1923

INVENTOR
Charles A. Rebhun.
BY Harry A. Baimer
ATTORNEY

Patented June 29, 1926.

1,590,316

UNITED STATES PATENT OFFICE.

CHARLES A. REBHUN, OF CINCINNATI, OHIO.

DISPLAY RACK.

Application filed October 16, 1923. Serial No. 668,910.

The present invention has relation to improvements in display racks, and consists in the novel features of construction more fully set forth in the specification and pointed out in the claim.

The object of my invention is to provide a knock-down display rack primarily for shoe-lasts, although shoes and other objects may be displayed thereon, that may be carried in a convenient parcel from place to place and set up in a few moments in a comparatively small space. A further object is to provide a display rack of few parts which, when assembled, will form a rigid structure. Further and other advantages will be better apparent from a detailed description of the invention in connection with the accompanying drawings, in which—

Figure 1:
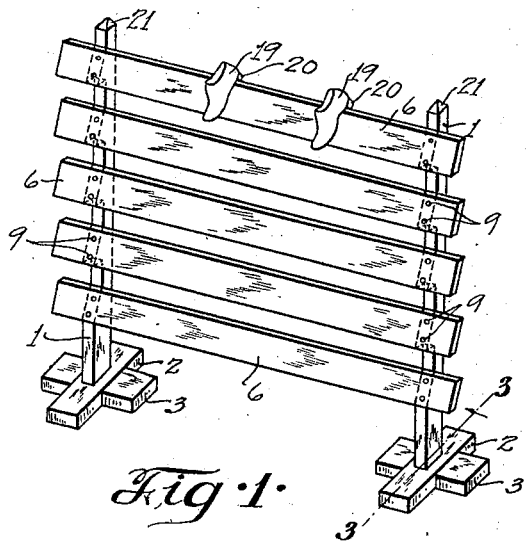
Figure 3:
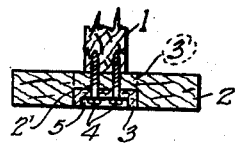
Figure 2:
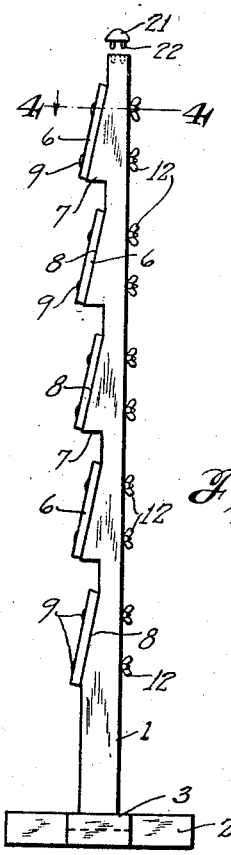
Figure 4:
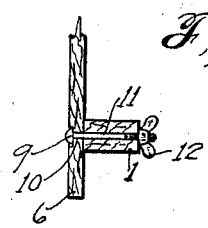
Figure 5:
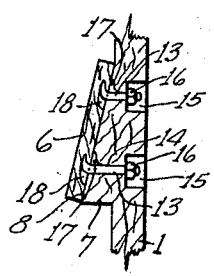

Figure 1 is a perspective view of my improved display rack with a couple of shoe-lasts in display thereon; Fig. 2 is a side elevation of the invention; Fig. 3 is a cross-sectional detail taken on the line 3—3 of Fig. 1; Fig. 4 is a cross-sectional detail taken on the line 4—4 of Fig. 2; Fig. 5 is a sectional detail of a modified form of the invention.

Referring to the drawings, 1, 1 represent suitable uprights each of which is provided with a suitable base comprising two members 2, 3, disposed at right angles and provided respectively with recesses 2', 3', which are brought together in assembling the base so that the outer faces of members 2 and 3 will be flush. The members 2 and 3 are secured together, and at the same time to the bottom of uprights 1, by lag screws 4, 4 of which there are two to each upright, said lag screws passing through the members 2 and 3 and entering the bottom of the upright. The member 3 is provided with a socket 5 for the head of each lag screw, said socket being large enough to permit the insertion of a socket wrench (not shown) for tightening or loosening the lag screws.

After the bases are secured to the uprights they may be stood up in place for securing cross-members 6 to them. It will be observed that each upright has a plurality of triangular projections 7 along one edge spaced apart, and it is against the inclined surface 8 of each projection that the cross-members 6 are secured. I prefer to secure the cross-members to the uprights by stove-bolts 9, two of which pass through openings 10, 10 near each end of the cross-members and through corresponding openings 11, 11 in the uprights, said bolts being secured by wing-nuts 12, 12 passed over their ends. However, if desired, I may use hooks 13, 13 (Fig. 5) held in openings 14, 14 in the uprights, said openings having enlargements 15, 15 for nuts 16, 16 screwed onto the threaded ends of the hooks. In order that the hooks 13 may not project from the edges of the uprights when the rack is knocked down I provide depressions 17, 17 in said edges for receiving the outer ends of the hooks. To secure the cross-members to the uprights I provide undercut depressions 18, 18 in the cross-members into which the hooks 13, 13 will hook.

The cross-members 6 are secured to the uprights in an inclined position so that they will furnish more stable support to the lasts 19 which are provided with pegs 20 in their heels, said pegs resting on the upper edge of the cross-member and the last bearing against the face of the cross-member.

In order to improve the ornamental effect of the racks, a cap 21 is secured to the top of each upright by dowels 22, 22.

The great advantage of my display rack, in addition to its knock-down feature, is that where heretofore a salesman had to hunt up tables to display his samples in a more or less haphazard way, he may now display his samples in a systematic, orderly visible manner, and have the display rack with him, as it may be packed in his trunk along with the samples.

Having described my invention, I claim:

A display rack comprising a pair of uprights having a plurality of vertically spaced projections with outwardly inclined faces, a plurality of suitable cross-members each of which is disposed against corresponding projections of the uprights, the horizontal edges of cross-members and projections lying in common planes, said uprights having hooks projecting from their inclined faces, and said cross-members having depressions to receive said hooks when in operative position.

In testimony whereof I hereunto affix my signature.

CHARLES A. REBHUN.